No. 681,333.  
J. F. T. MJÖEN.  
SPITTING POT.  
(Application filed Nov. 2, 1900.)  
Patented Aug. 27, 1901.

(No Model.)

Witnesses:  
Ella L. Giles

Inventor  
J. F. T. Mjöen.  
By Richards  
Attorneys

UNITED STATES PATENT OFFICE.

JOHN FREDRIK TANK MJÖEN, OF CHRISTIANIA, NORWAY.

SPITTING-POT.

SPECIFICATION forming part of Letters Patent No. 681,333, dated August 27, 1901.

Application filed November 2, 1900. Serial No. 35,219. (No model.)

*To all whom it may concern:*

Be it known that I, JOHN FREDRIK TANK MJÖEN, a subject of the King of Sweden and Norway, residing at Christiania, Norway, have invented certain new and useful Improvements in Spittoons, of which the following is a specification.

My invention relates to a spitting-pot or expectorating-cup comprising a box or receiver of such a construction and made of such materials that the sputum-receiver proper, after having been used by persons affected with chest diseases or others whose sputum it is desired to collect, can conveniently be removed from its receptacle and burned at once, with its contents.

The invention is illustrated in the accompanying drawings, in which—

Figure 1:
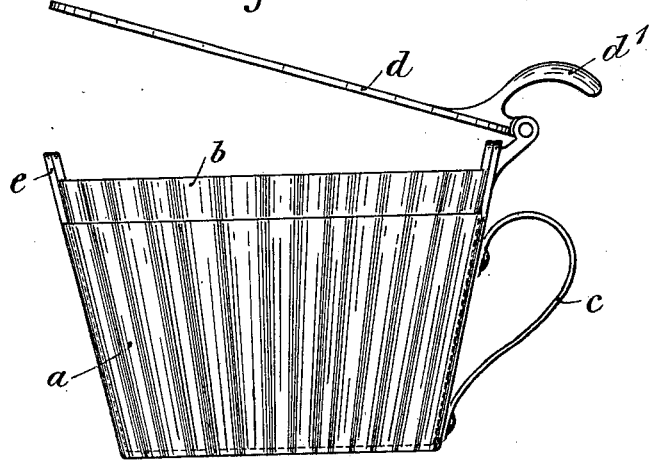
Figure 2:
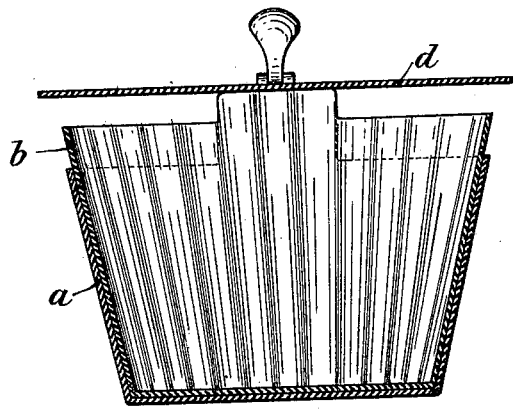

Figure 1 is a side elevation of my improved spitting-pot, and Fig. 2 is a section taken at a right angle to Fig. 1.

The spitting-pot consists of an outer casing and a loose inner receptacle or sputum-holder proper, which, as above stated, is composed of such materials as in the first place of course to be proof against the escape of its contents, and, secondly, to allow of its being destroyed by burning after a short period of use in such a way as that it is only used for a short time— *e. g.*, for twenty-four hours. For this purpose it may suitably be constructed of papier-mâché impregnated with a solution of hard paraffin, in which form it is at once cheap and easily combustible.

The spitting-pot is intended to stand on a table, and consists of an outer casing $a$, of zinc, aluminium, or any other suitable material, which serves to inclose an inner sputum-holder $b$, which is of such a form and size as to sit tightly in the former. The outer casing $a$ is a little shallower than the inner receptacle $b$ and is provided with a handle $c$ and a cover $d$, having a lug $d'$, which latter serves as a handle for the cover $d$, which latter may most suitably be secured by a hing-joint. Tongues $e$ support the cover when closed. Thus the idea is that the patient every time he uses the pot shall open and close the cover just as with an ordinary drinking-cup. The inner receptacle $b$ forms the sputum-holder proper and can, as shown in the drawings, be easily withdrawn, together with the contents, from the outer casing. It covers while in use all portions of the outer casing, which is thus protected against the infectious tubercular sputum. Since the receptacle $b$ is composed of papier-mâché or the like material and is impregnated with a combustible substance, it may easily be burned, and thus destroyed, together with its whole contents.

The spitting-pot is most suitably made of conical form and ribbed, as shown in the drawings; but it may of course be made of any other form preferred.

Having now described my invention, what I claim as new, and desire to secure by Letters Patent, is—

In a spitting-pot the combination of an outer casing $a$ of zinc, aluminium or the like and an inner receptacle of combustible material but proof against leakage, said casing having a hinged cover $d$ and a lug $e$ for the cover in order to form a space between the upper edge of the casing $a$ and the cover $d$ so that the receptacle $b$ may be removed from the casing and also when used may completely cover the internal surface of the outer casing, substantially as set forth.

In witness whereof I have hereunto set my hand in presence of two witnesses.

JOHN FREDRIK TANK MJÖEN.

Witnesses:
KATHINKA PAULSUN,
AXEL LAHN.